(12) United States Patent
Ozawa

(10) Patent No.: US 8,169,526 B2
(45) Date of Patent: May 1, 2012

(54) LOW NOISE SIGNAL REPRODUCING METHOD FOR A SOLID STATE IMAGING DEVICE

(76) Inventor: Naoki Ozawa, Akishima (JP)

( * ) Notice: Subject to any disclaimer, the term of this patent is extended or adjusted under 35 U.S.C. 154(b) by 365 days.

(21) Appl. No.: 12/549,359

(22) Filed: Aug. 28, 2009

(65) Prior Publication Data

US 2011/0050970 A1 Mar. 3, 2011

(51) Int. Cl.
*H04N 5/217* (2011.01)
*H04N 3/14* (2006.01)
*H04N 5/335* (2011.01)

(52) U.S. Cl. .......................... 348/311; 348/308; 348/241

(58) Field of Classification Search .................. 348/294, 348/311–324
See application file for complete search history.

(56) References Cited

U.S. PATENT DOCUMENTS

| | | | | | |
|---|---|---|---|---|---|
| 5,990,948 | A * | 11/1999 | Sugiki | ............................ | 348/250 |
| 7,268,812 | B2 * | 9/2007 | Sato et al. | ...................... | 348/246 |
| 7,551,212 | B2 * | 6/2009 | Ise | ................................ | 348/243 |
| 7,738,017 | B2 * | 6/2010 | Smith | ............................ | 348/294 |
| 7,847,846 | B1 * | 12/2010 | Ignjatovic et al. | ............. | 348/301 |
| 7,999,864 | B2 * | 8/2011 | Ishida | ............................ | 348/241 |
| 2006/0262209 | A1 * | 11/2006 | Kishi | ............................ | 348/297 |
| 2007/0132868 | A1 * | 6/2007 | Lee et al. | ....................... | 348/308 |

* cited by examiner

*Primary Examiner* — Jason Chan
*Assistant Examiner* — Pritham Prabhakher

(57) ABSTRACT

A method for reproducing a low noise signal for a solid state imaging device which can reduce not only the reset noise but the amplifier noise around frequency zero, avoiding the saturation of the voltage conversion part in a bright scene, is accomplished by controlling a reset pulse of a CCD imaging device according to the result of comparing the output signal of the CCD imaging device with a reference signal value. When the output signal of the CCD imaging device is smaller than the reference signal value, the reset pulse is not applied to the CCD imaging device. Thereat, a pixel signal is reproduced as a differential signal between two signals sampled at two points with an interval of T0, the amplifier noise around frequency zero being reduced in the pixel signals.

2 Claims, 12 Drawing Sheets

$$fn(t) = exp(j2\pi ft) \quad (8)$$

$$fn\_cds(t) = \left[ exp(2\pi f(t - dt_1)) \cdot \{1 - exp(-j2\pi fdt_0)\} \right]$$
$$\cdot \sum \delta(t - dt_1 - n \cdot T_0) \quad (9)$$

$$Fn\_cds(f) = F\left[ exp(2\pi f(t - dt_1)) \cdot \{1 - exp(-j2\pi fdt_0)\} \right]$$
$$* F\left[ \sum \delta(t - dt_1 - n \cdot T_0) \right] \quad (10)$$

$$f_1(x) * f_2(x) = \int f_1(y) \cdot f_2(x - y) dy \quad (11)$$

$$fnsd(t) = fn(t - T_0) \cdot \sum \delta(t - n \cdot T_0) \quad (12)$$

$$fn\_cds_2(t) = fns(t) - fnsd(t)$$
$$= \{fn(t) - fn(t - T_0)\} \cdot \sum \delta(t - n \cdot T_0) \quad (13)$$

$$Fn\_cds_2(f) = F\left[ exp(2\pi ft) \cdot \{1 - exp(-j2\pi fT_0)\} \right]$$
$$* F\left[ \sum \delta(t - n \cdot T_0) \right] \quad (14)$$

$$fps(t) = \sum \delta(t - n \cdot T_0) \quad (1)$$

$$fpn(t) = \sum \delta(t - n \cdot T_0 + dt_0) \quad (2)$$

$$fns(t) = fn(t) \cdot \sum \delta(t - n \cdot T_0) \quad (3)$$

$$fnn(t) = fn(t) \cdot \sum \delta(t - n \cdot T_0 + dt_0) \quad (4)$$

$$f'ns(t) = fn(t - dt_1) \cdot \sum \delta(t - dt_1 - n \cdot T_0) \quad (5)$$

$$f'nn(t) = fn(t - dt_0 - dt_1) \cdot \sum \delta(t - dt_1 - n \cdot T_0) \quad (6)$$

$$\begin{aligned} fn\_cds(t) &= f'ns(t) - f'nn(t) \\ &= \{fn(t - dt_1) - fn(t - dt_0 - dt_1)\} \\ &\quad \cdot \sum \delta(t - dt_1 - n \cdot T_0) \quad (7) \end{aligned}$$

FIG.9

$$fn(t) = \exp(j2\pi ft) \quad (8)$$

$$fn\_cds(t) = \left[\exp(2\pi f(t-dt_1)) \cdot \{1 - \exp(-j2\pi fdt_0)\}\right]$$
$$\cdot \sum \delta(t - dt_1 - n \cdot T_0) \quad (9)$$

$$Fn\_cds(f) = F\left[\exp(2\pi f(t-dt_1)) \cdot \{1 - \exp(-j2\pi fdt_0)\}\right]$$
$$* F\left[\sum \delta(t - dt_1 - n \cdot T_0)\right] \quad (10)$$

$$f_1(x) * f_2(x) = \int f_1(y) \cdot f_2(x-y) dy \quad (11)$$

$$fnsd(t) = fn(t - T_0) \cdot \sum \delta(t - n \cdot T_0) \quad (12)$$

$$fn\_cds2(t) = fns(t) - fnsd(t)$$
$$= \{fn(t) - fn(t - T_0)\} \cdot \sum \delta(t - n \cdot T_0) \quad (13)$$

$$Fn\_cds2(f) = F\left[\exp(2\pi ft) \cdot \{1 - \exp(-j2\pi fT_0)\}\right]$$
$$* F\left[\sum \delta(t - n \cdot T_0)\right] \quad (14)$$

FIG.10

LOW NOISE SIGNAL REPRODUCING METHOD FOR A SOLID STATE IMAGING DEVICE

CROSS-REFERENCE TO RELATED APPLICATION

Not Applicable

BACKGROUND OF THE INVENTION

1. Field of the Invention

This invention relates to solid state imaging device technology, and more particularly, to such signal reproducing methods for providing low noise output signals from a solid state imaging device.

2. Description of the Prior Art

A solid state imaging device is employed in numerous image capturing apparatuses including digital still cameras. In a solid state imaging device for digital still cameras, the size of a pixel is miniaturized with the increase in the number of pixels on an imaging device more and more. Since miniaturization of pixel size causes reduction of the signal level from a pixel, reduction of the noise on the signal is important to keep the signal to noise ratio of a reproduced picture high.

The noise generated in a CCD imaging device, being a main kind of the solid state imaging device, comprises shot noise correlated to the signal, reset noise generated by reset switch, and amplifier noise. The correlated double sampling method, having been disclosed in U.S. Pat. No. 3,781,574 issued Dec. 25, 1973 to M. H. White, is well known as a method that reduces reset noise and amplifier noise on the signal of a CCD imaging device. Moreover, the pixel mixture readout method which reduces the influence of amplifier noise is proposed in Japanese Patent Publications, 60-142147 and 2006-226376. Referring to the drawings, these methods are explained briefly.

First, the operation of the correlated double sampling method by the prior art will be explained. An example of the embodiment of a image capturing apparatus using a CCD imaging device is shown in FIG. 3, wherein FIG. 3 shows the portion concerning to explanation of the correlated double sampling method or the pixel mixture readout method, and does not show the details of the portion which performs general signal processing.

Reference numeral 1 represents a CCD imaging device in FIG. 3. The CCD imaging device 1 is driven by several pulses which are generated by a pulse generator 5 and are applied from input terminal 106, 107, and 108. In the CCD imaging device 1, the signal charges generated during the fixed exposure period and accumulated to each pixel 101 are read to corresponding vertical CCD 102 at every vertical blanking period simultaneously by operation of transfer gates which are not shown in the figure. By applying vertical transfer pulses to vertical transfer gates which are not shown in the figure, the signal charges read to each vertical CCD 102 are transferred toward a horizontal CCD 103 by one step at every horizontal blanking period. The signal charges transferred to the horizontal CCD 103 are transferred toward a voltage conversion part 104 at a horizontal period.

Generally, the transfer of the signal charges in the horizontal CCD 103 is accomplished by applying two-phase transfer pulses to two-set of transfer gates, H1 and H2, which are not shown in the figure. In FIG. 3, two transfer pulses, Ph1 and Ph2, generated by the pulse generator 5 are applied to the input terminal 106 connected to H1, and the input terminal 107 connected to H2, respectively. When the transfer gate of the last stage of the horizontal CCD 103 is H1 for example, a signal charge is moved to the voltage conversion part 104 at the timing which Ph1 changes to a low level from a high level and is converted into a voltage signal. The voltage signal converted in the voltage conversion part 104 is amplified by an amplifier 105 and is outputted as output signal Vout1 from an output terminal 109. Before the following transfer of next signal charge that occurs next Ph1's change from a high level to a low level, the signal charge in the voltage conversion part 104 is swept out by applying a reset pulse Prst1 generated by the pulse generator 5 from the terminal 108.

The output signal Vout1 acquired from the output terminal 109 of the CCD imaging device is applied to an amplifier 2. The output signal of the amplifier 2 is applied to a sampling circuit 3 and a sampling circuit 4. The sampling circuit 3 and 4 are driven by sampling pulse Ps1 and Pn1 generated by the pulse generator 5, respectively. The output signal acquired from the sampling circuit 3 and the output signal acquired from the sampling circuit 4 are applied to a differential circuit 6. The output signal acquired from the differential circuit 6 is applied to a sampling circuit 7, where the sampling circuit 7 is driven by a sampling pulse Pout1 generated by the pulse generator 5. Finally, the output signal acquired from the sampling circuit 7 is applied to an image processing circuit 8 that converts an input signal into a video signal. The function of the image processing circuit 8 may be the same as that of a conventional digital still camera. Thus, it is not explained here.

Referring now to FIG. 4, the timing chart concerning to the output signal Vout1 is explained. In FIG. 4, the waveform of Ph1, Prst1, and Vout1 are illustrated, respectively. In the output signal Vout1 shown in FIG. 4, a reset noise 201a generated by the reset operation appears at T11 when the reset pulse Prst1 changes to a low level from a high level. Furthermore, a pixel signal 202a generated by a signal charge appears, being added to the reset noise 201a, at T13 when Ph1 changes to a low level from a high level as shown in FIG. 4. In accordance with the case of the general CCD imaging device, the pixel signal generated by the signal charge is shown as a negative signal in FIG. 4.

As shown in FIG. 3, the output signal Vout1 of the CCD imaging device 1 is applied to the sampling circuit 3 and the sampling circuit 4, being amplified by the amplifier 2. To the sampling circuit 4, a sampling pulse Pn1 shown in FIG. 4 is applied so that a signal at T12 that comprises only the reset noise 201a can be sampled. Consequently, a signal Vn1 shown in FIG. 4 that comprises sequential signals of only reset noise is acquired from the sampling circuit 4. On the other hand, a sampling pulse Ps1 shown in FIG. 4 is applied to the sampling circuit 3 so that a signal at T14 that comprises the pixel signal 202a mixed with the reset noise 201a can be sampled. Consequently, a signal Vs1 shown in FIG. 4 that comprises sequential pixel signals mixed with reset noise is acquired from the sampling circuit 3.

As shown in FIG. 3, the signal Vs1 from the sampling circuit 3 and the signal Vn1 from the sampling circuit 4 are applied to the differential circuit 6 to generate a differential signal Vdif1 equal to Vs1−Vn1. Thus, the differential signal Vdif1 acquired from the differential circuit 6 becomes the signal illustrated in FIG. 4. As shown in FIG. 4, the differential signal Vdif1 in the period between T15 and T17 is the pixel signal 202a, wherein T15 is the timing at which the sampling pulse Ps1 is turned off and T17 is the timing at which the sampling pulse Pn1 is turned on. There, the differential signal Vdif1 is applied to the sampling circuit 7, and is sampled by the sampling pulse Pout1 shown in FIG. 4. As shown in FIG. 4, a signal Vcds1 acquired from the sampling circuit 7 comprises only sequential pixel signals and does not contain reset noise. For example, the signal Vcds1 at T16 comprises only the pixel signal 202a. The method described above is a fundamental operation of the correlated double sampling method.

Now, the amplifier noise generated by the amplifier 105 and mixed into the signal Vcds1 will be explained. A function fps (t) is defined as the function of the sampling pulse Ps1 applied to the sampling circuit 3, and a function fpn(t) is defined as the function of the sampling pulse Pn1 applied to the sampling circuit 4. The function fps (t) and the function fpn(t) are represented in formula 1 and formula 2 shown in FIG. 9 respectively, wherein T0 represents the period of the horizontal transfer pulses and is equal to the period of Ps1 or Pn1. Moreover, dt0 represents the phase difference between Pn1 and Ps1, being a difference between T12 and T14 in FIG. 4.

When fn(t) is defined as a function that represents the amplifier noise generated by the amplifier 105, a function fns(t) that represents the amplifier noise mixed into the signal Vs1 acquired from the sampling circuit 3 is represented as formula 3 shown in FIG. 9. Similarly, a function fnn(t) that represents the amplifier noise mixed into the signal Vn1 acquired from the sampling circuit 4 is represented as formula 4 shown in FIG. 9. Furthermore, fns (t) and fnn (t) sampled in the sampling circuit 7 by the sampling pulse Pout1 are rewritten as formula 5 and formula 6 shown in FIG. 9 respectively, wherein dt1 is the phase difference between Ps1 and Pout1. Thus, a function fn_cds (t) representing the amplifier noise contained in the signal Vcds1 acquired from the sampling circuit 7 is represented as formula 7 shown in FIG. 9.

In formula 7, the initial portion of the right side, fn (t−dt1)− fn (t−dt0−dt1), means getting a differential signal between two sampled signals that are acquired by sampling the amplifier noise fn (t) at two points with an interval of dt0. Now, the function fn (t) is assumed as a signal whose signal level at all the frequency is equal to one. Then, the function fn (t) is represented as formula 8 shown in FIG. 10. Consequently, formula 9 shown in FIG. 10 is acquired by applying formula 8 to formula 7. In formula 9, the initial portion of the right side represents a frequency response of the differential signal between two sampled signals that are acquired by sampling the input signal at two points with an interval of dt0.

When a function x is represented by a multiplication of a function y and a function z in the time domain, the function X is represented by the convolution of the function Y and the function Z, wherein the function X, Y, and Z mean functions acquired by conversion of the function x, y, and z to the frequency domain. Thus, the function Fn_cds(f) acquired by converting to the frequency domain the function fn_cds(t) shown in formula 9 is represented as formula 10 shown in FIG. 10, where "F[ ]" means an operation of converting to the frequency domain and "*" means an operation of convolution represented in formula 11 shown in FIG. 10. Consequently, the function Fn_cds(f) in formula 10 represents the magnitude spectrum of the amplifier noise mixed into the signal acquired by the correlated double sampling method when the amplifier noise is assumed to have a flat magnitude spectrum.

In formula 10, the initial portion of the right side represents a frequency response of the amplifier noise in the signal acquired by the correlated double sampling method. When dt0 is replaced with a half of T0, as is in the general case of the correlated double sampling method, the frequency response represented by the initial portion of the right side in formula 10 is shown in FIG. 5A. Formula 10 represents that Fn_cds(f) comprises the base-band frequency component and its harmonics frequency components located at frequency n/T0, where n is integer. Thus, when the frequency band width of the amplifier 105 is assumed to be up to 2/T0 and the magnitude of fn(t) is 1 at all the frequency, the magnitude spectrum of the base-band component of Fn_cds(f) becomes the absolute value of sin(f*pi*T0/2) as is represented in FIG. 5B. Moreover, the magnitude spectrum of the harmonics frequency component located at 1/T0 of Fn_cds(f) becomes the absolute value of cos(f*pi*T0/2) as is represented in FIG. 5C. Similarly, the magnitude spectrum of the harmonics frequency component located at 2/T0 is represented in FIG. 5D, and the magnitude spectrum of the harmonics frequency component located at 3/T0 is represented in FIG. 5E, respectively. Since there is no correlation in the noise of each frequency, a summation of the base-band frequency component and harmonics frequency components is obtained by power summation. So, the magnitude spectrum of Fn_cds(f) including base-band component and harmonics components is represented in FIG. 5F. As shown in FIG. 5F, the magnitude of Fn_cds(f) is 2-by-root2 at all the frequency.

Now, another prior method that reduces not only the reset noise but the amplifier noise by the pixel mixture readout method disclosed in Japanese patent application number 2006-226376 will be explained. An example of the embodiment of an image capturing apparatus employing the pixel mixture readout method is shown in FIG. 6, and a timing chart concerning to its operation is shown in FIG. 7.

In the imaging apparatus shown in FIG. 6, the operation of the CCD imaging device 1, the amplifier 2, the sampling circuit 3, the sampling circuit 4, and the differential circuit 6 is same as that of the imaging apparatus shown in FIG. 3. On the other hand, the output signal acquired from the sampling circuit 3 is applied to a differential circuit 10 and a delay circuit 9 simultaneously, wherein the output signal of the delay circuit 9 is applied to the differential circuit 10. The output signal of the differential circuit 6 and the output signal of the differential circuit 10 are applied to a gate circuit 11, wherein the gate circuit 11 is controlled by a control signal generated by the pulse generator 5. The output signal of the gate circuit 11 is applied to a sampling circuit 7 which is driven by a sampling pulse Pout2 generated by the pulse generator 5. Finally, the output signal acquired from the sampling circuit 7 is applied to the image processing circuit 8 that converts the input signal into the video signal.

The basic operation of the CCD imaging device 1 in FIG. 6 is same as that of the first prior art shown in FIG. 3. Namely, the signal charges generated during the fixed exposure period and accumulated to each pixel 101 are read to corresponding vertical CCD 102 at every vertical blanking period simultaneously by operation of transfer gates which are not shown in a figure. And, the signal charges read to each vertical CCD 102 are transferred toward a horizontal CCD 103 by one step at every horizontal blanking period. Moreover, the signal charges transferred to the horizontal CCD 103 are transferred toward a voltage conversion part 104 at a horizontal period.

In the CCD imaging device 1 shown in FIG. 6, the voltage signal converted in the voltage conversion part 104 is amplified by an amplifier 105 and is outputted as output signal Vout2 from an output terminal 109. On the other hand, an interval of a reset pulse Prst2 applied to the terminal 108 is four times of that of Ph1 as shown in FIG. 7. Thus, the output signal Vout2 acquired from the output terminal 109 is shown in FIG. 7, wherein a reset noise 201a appears at T21 and a pixel signal 202a appears at T23, being added to the reset noise 201a. In FIG. 7, T21 is the point at which Prst2 changes to a low level from a high level and T23 is the first point at which Ph1 changes to a low level from a high level after T21. Additionally, the pixel signal 202b by next signal charge appears at T25 at which Ph1 changes to a low level from a high level next time, being added to the reset noise 201a and the pixel signal 202a. Similarly, the pixel signal 202c and 202d by next signal charges appear at T27 and T29 respectively, being added to preceding signals.

As shown in FIG. 6, the output signal Vout2 of the CCD imaging device 1 is applied to a sampling circuit 3 and a sampling circuit 4, being amplified by amplifier 2. To the sampling circuit 4, a sampling pulse Pn2 shown in FIG. 7 is applied so that a signal at T22 that comprises only the reset noise 201a can be sampled. Consequently, a signal Vn2 shown in FIG. 7 that comprises sequential signals of only reset noise is acquired from the sampling circuit 4.

On the other hand, a sampling pulse Ps2 shown in FIG. 7 is applied to the sampling circuit 3. Thus, a signal at T24 that comprises the pixel signal 202a mixed with the reset noise 201a is sampled by the sampling circuit 3. Similarly, a signal at T26 that comprises the pixel signal 202b mixed with the reset noise 201a and the pixel signal 202a is sampled. Furthermore, a signal at T28 and a signal at T30 are sampled respectively, being increased preceding signals by next pixel signals.

As shown in FIG. 6, the signal Vs2 acquired from the sampling circuit 3 and the signal Vn2 acquired from the sampling circuit 4 are applied to the differential circuit 6 to generate a differential signal Vdef2 equal to Vs2−Vn2. Thus, the differential signal Vdef2 acquired from the differential circuit 6 is illustrated as shown in FIG. 7. As shown in FIG. 7, the differential signal Vdef2 in the period between T24 and T26 is the pixel signal 202a.

Additionally, as shown in FIG. 6, the signal Vs2 acquired from the sampling circuit 3 is applied to a delay circuit 9 in which a delay time between the input signal and the output signal is T0. The signal Vs2 and the output signal of the delay circuit 9 are applied to a differential circuit 10 to generate a differential signal Vdef3. As shown in FIG. 7, the differential signal Vdef3 between T26 and T28 is only the pixel signal 202b from which the reset noise 201a and the pixel signal 202a have been removed. Furthermore, the differential signal Vdef3 between T28 and T30 is only the pixel signal 202c, and the differential signal Vdef3 between T30 and T32 is only the pixel signal 202d.

As shown in FIG. 6, the differential signal Vdef2 acquired from the differential circuit 6 and the differential signal Vdef3 acquired from the differential circuit 10 are applied to a gate circuit 11. The gate circuit 11 is controlled to output the differential signal Vdef2 comprising only the pixel signal 202a between T24 and T26 and to output the differential signal Vdef3 comprising only the pixel signal, 202b, 202c, and 202d, between T24 and T32. When the output signal of the gate circuit 11 is sampled by a sampling circuit 7 using a sampling pulse Pout2 shown in FIG. 7, a signal Vcds2 acquired from the sampling circuit 7 comprises only sequential pixel signals and does not contain reset noise. Additionally, the portion following the sampling circuit 7 in FIG. 6 is same as that in FIG. 3.

In the imaging apparatus shown in FIG. 6, the amplifier noise comprised in the pixel signal acquired from the differential circuit 6 is same as that of the prior art shown in FIG. 3. On the other hand, the amplifier noise comprised in the pixel signal acquired from the differential circuit 10 is given by the followings.

Since the signal Vs2 applied to the differential circuit 10 is the output signal of the sampling circuit 3 sampled by the sampling pulse Ps2 that is same as the sampling pulse Ps1 of the prior art shown in FIG. 3, the function that represents the amplifier noise comprised in the signal Vs2 is fns(t) shown in formula 3. On the other hand, a function fnsd(t) that represents the amplifier noise comprised in the output signal of the delay circuit 9 is represented as formula 12 shown in FIG. 10. Thus, a function fn_cds2(t) that represents the amplifier noise comprised in the differential signal Vdef3 acquired from the differential circuit 10 is represented in formula 13 shown in FIG. 10.

In formula 13, the initial portion of the right side, fn(t)−fn(t−T0), means getting a differential signal between two sampled signals that are acquired by sampling the amplifier noise fn(t) at two points with an interval of T0. As mentioned above, when the function fn(t) is assumed as a signal whose signal level at all the frequency is equal to one, formula 10 acquired from formula 9 by converting to the frequency domain represents the magnitude spectrum of the differential signal between two sampled signals that are acquired by sampling the input signal at two points with an interval of dt0, wherein formula 9 is acquired by applying formula 8 to formula 7. Similarly, when the function fn(t) in formula 13 is replaced by formula 8, a function Fn_cds2(f) in formula 14 shown in FIG. 10 acquired from formula 13 by converting to the frequency domain represents the magnitude spectrum of the differential signal between two sampled signals that are acquired by sampling the input signal at two points with an interval of T0.

In formula 14, the initial portion of the right side represents a frequency response of the amplifier noise in the differential signal between two sampled signals that are acquired by sampling the amplifier noise fn(t) at two points with an interval of T0, and is illustrated in FIG. 8A. Thus, when the frequency band width of the amplifier 105 is assumed to be up to 2/T0 and the magnitude of fn(t) is 1 at all the frequency, the magnitude spectrum of the base-band component of Fn_cds2(f) becomes the absolute value of sin(f*pi*T0) as is represented in FIG. 8B. Moreover, the magnitude spectrum of the harmonics frequency component located at 1/T0 of Fn_cds2(f) becomes the absolute value of sin(f*pi*T0) as is represented in FIG. 8C. Similarly, the magnitude spectrum of the harmonics frequency component located at 2/T0 is represented in FIG. 8D, and the magnitude spectrum of the harmonics frequency component located at 3/T0 is represented in FIG. 8E, respectively. Since there is no correlation in the noise of each frequency, a summation of the base-band frequency component and harmonics frequency components is obtained by power summation. So, the magnitude spectrum of Fn_cds2(f) including base-band component and harmonics components is represented by 4-by-sin(f*pi*T0) as shown in FIG. 8F. Thus, the magnitude around frequency zero is zero, and the magnitude at frequency 1/2T0 and 3/2T0 is four time of fn(t).

It is known that, according to the response characteristics of the human visual system, the sensitivity to an image by high frequency component is lower than that to an image by low frequency component. Hence, even if the high frequency noise increases slightly, a decrease of the noise around frequency zero leads to a low noise reproduced image. In the above description, the interval of the reset pulse Prst2 is assumed as 4 time of the interval of Ph1 as shown in FIG. 7. Thus, the amplifier noise around frequency zero is reduced in the pixel signal of 3/4 pixels. Hence, the amplifier noise around frequency zero is reduced lower than that of the conventional correlated double sampling method.

If the interval of the reset pulse Prst2 is increased more than four time of the interval of Ph1, the amplifier noise around frequency zero can be reduced moreover. However, when the interval of the reset pulse Prst2 is set to eight time of the interval of Ph1 for instance, it is necessary to convert the signal charge acquired from eight pixels without saturating the voltage conversion part 104. Otherwise, the pixel signal can not be acquired from the differential signal between two signals sampled at two continuous sampling points. To avoid the saturation of the voltage conversion part 104, a signal charge from each pixel must be up to one eighth of the maximum signal charge which can be acquired by the conventional readout operation. So, though the prior method employing the pixel mixture readout operation can reduce not only the reset noise but the amplifier noise around frequency zero, an image in which the pixel mixture readout method can be applied is limited to relatively dark scene.

BRIEF SUMMARY OF THE INVENTION

The object of the present invention is to provide a low noise signal reproducing method for a solid state imaging device which can reduce not only the reset noise but the amplifier noise around frequency zero, avoiding the saturation of the voltage conversion part in a bright scene.

The object of the invention is achieved by employing a signal reproducing method that comprises a procedure for controlling a reset pulse of a CCD imaging device according to the result of comparing the output signal of the CCD imaging device with a reference signal value. When the output signal of the CCD imaging device is smaller than the reference signal value, the reset pulse is not applied to the CCD imaging device. On the other hand, when the output signal of the CCD imaging device is larger than the reference signal value, the reset pulse is applied to the CCD imaging device. Consequently, the saturation of the voltage conversion part will be avoided even when the signal charge generated by the pixel is relatively large. Furthermore, when the signal charge generated by the pixel is relatively small, many pixel signals will be reproduced as a differential signal between two signals sampled at two points with an interval of T0. Hence, the amplifier noise around frequency zero will be reduced in the pixel signals.

BRIEF DESCRIPTION OF THE DRAWINGS

The aforementioned aspects and other features of the invention are explained in the following description, taken in connection with the accompanying drawing wherein:

FIG. 9 shows formula 1 to 7; and

FIG. 10 shows formula 8 to 14.

DETAILED DESCRIPTION OF THE INVENTION

Figure 1:
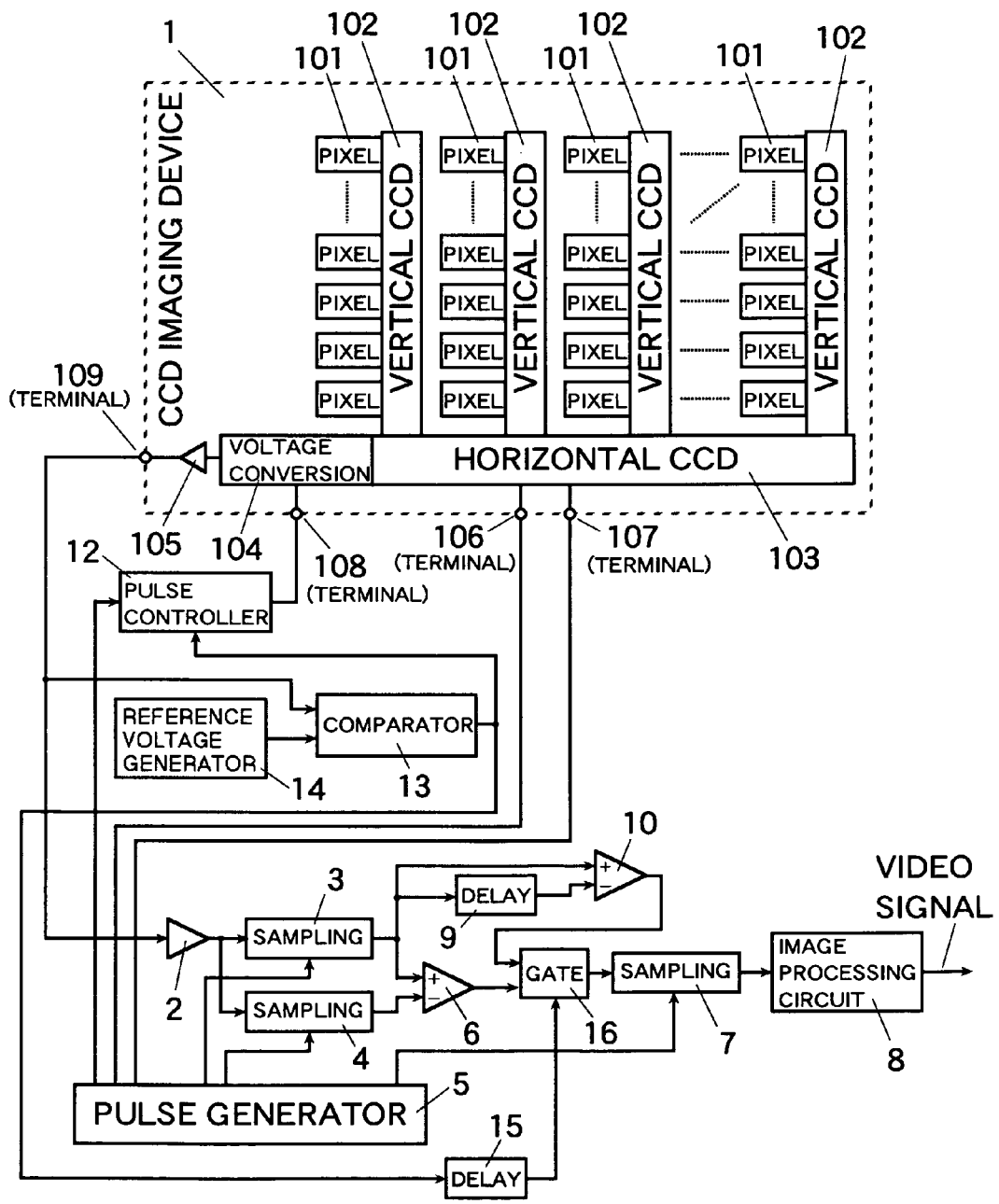
FIG. 1 is a block diagram illustrative of a preferred embodiment of the subject invention in combination with a CCD imaging device.
Figure 2:
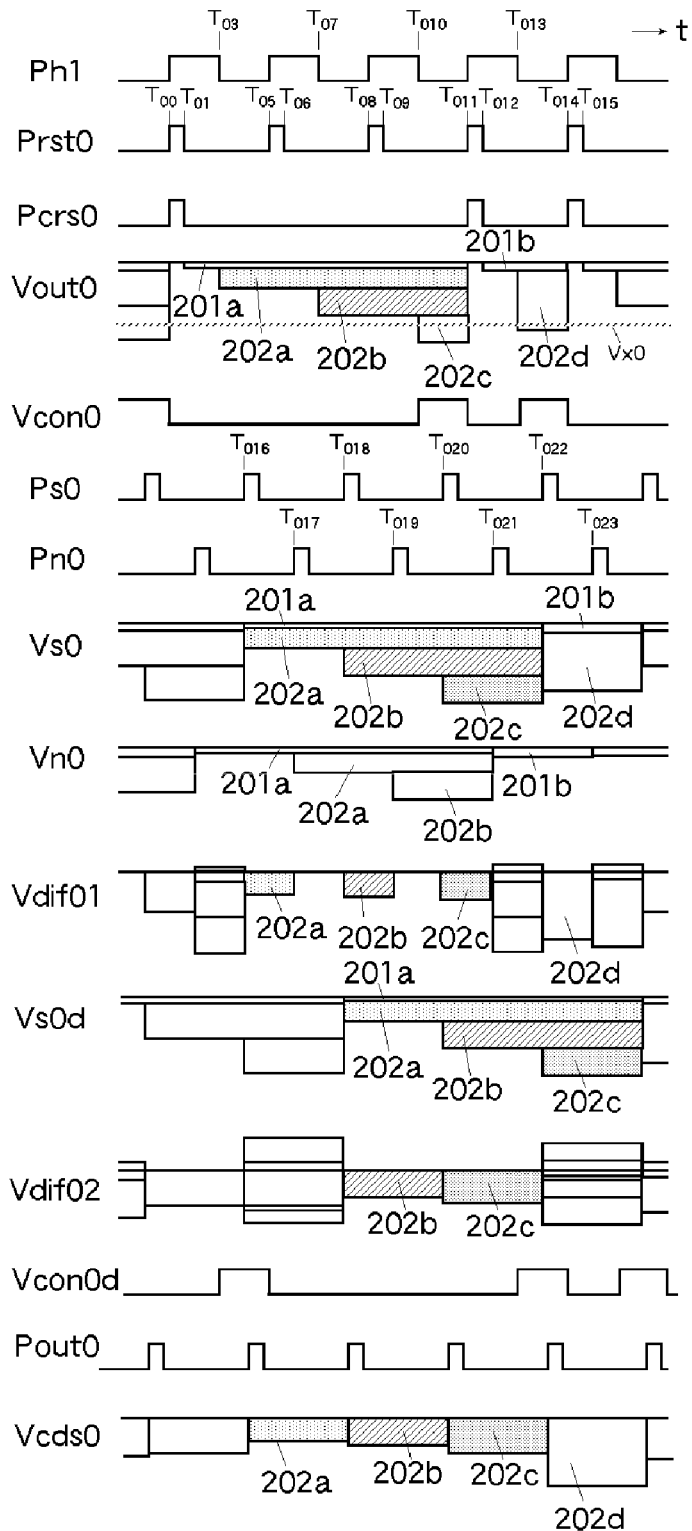
FIG. 2 is a waveform timing diagram useful for understanding the operation of the embodiment of FIG. 1.
Figure 3:
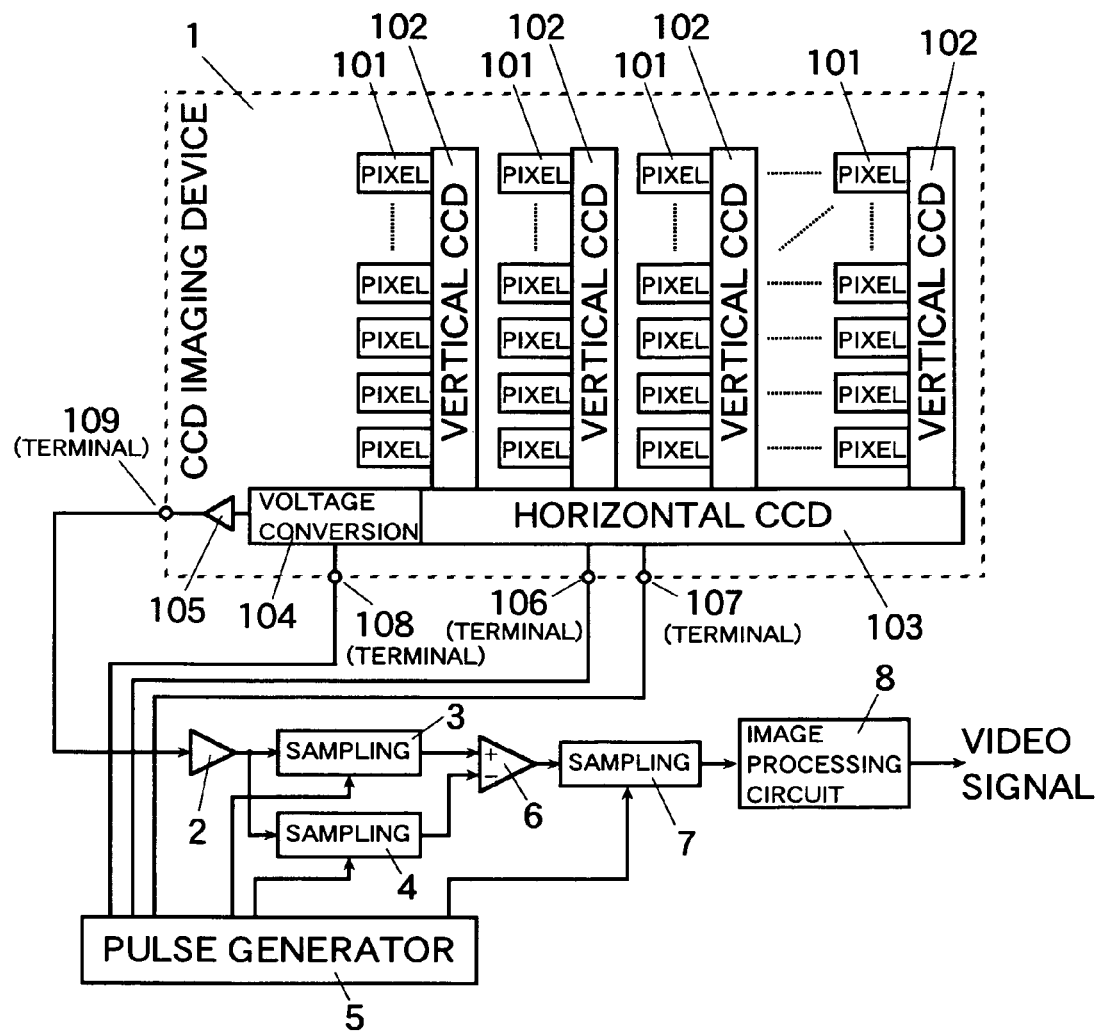
FIG. 3 is a block diagram illustrative of a embodiment of the prior art employing conventional CDS method in combination with a CCD imaging device.
Figure 4:
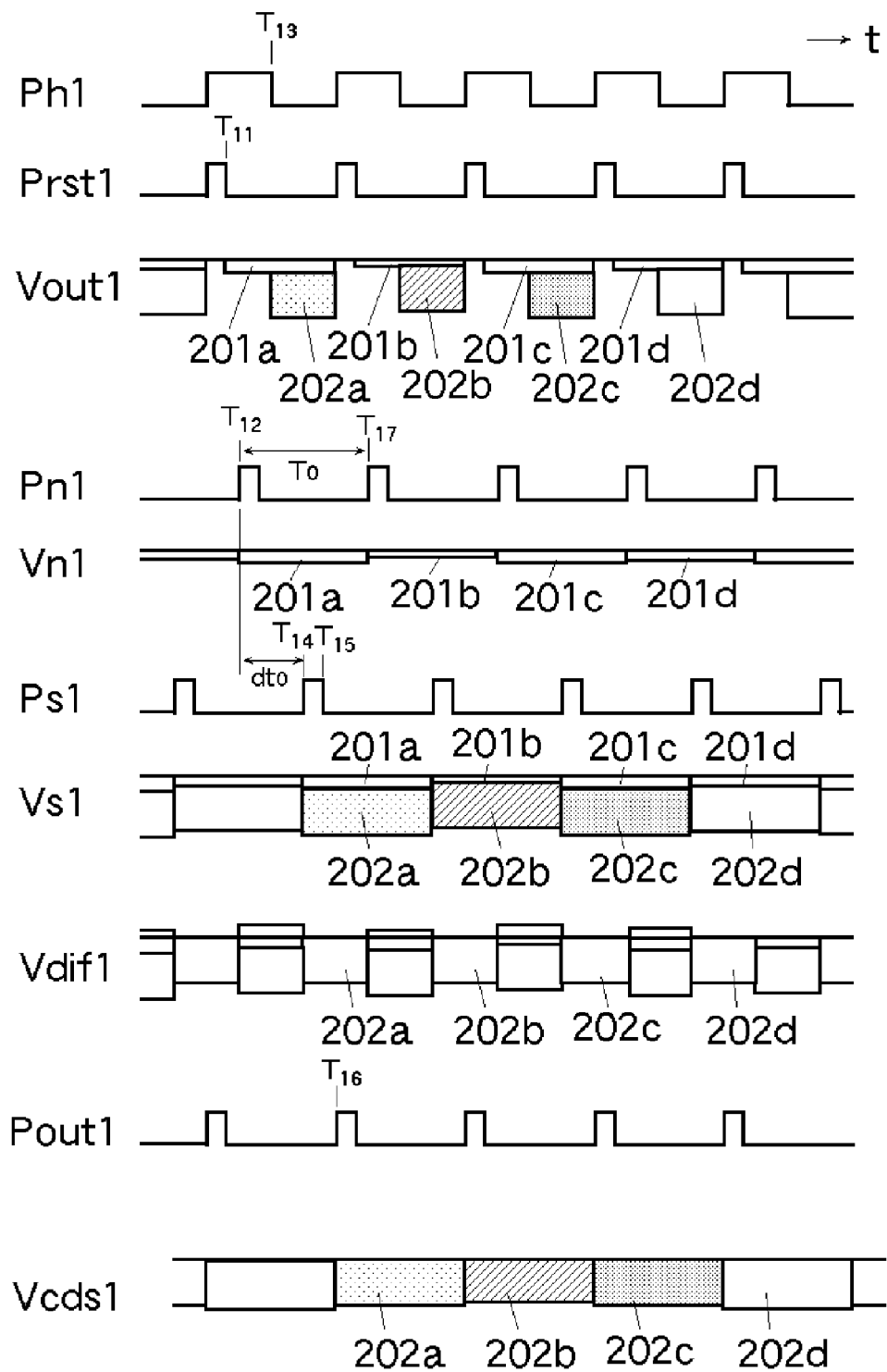
FIG. 4 is a waveform timing diagram useful for understanding the operation of the embodiment of FIG. 3.
Figure 5A:
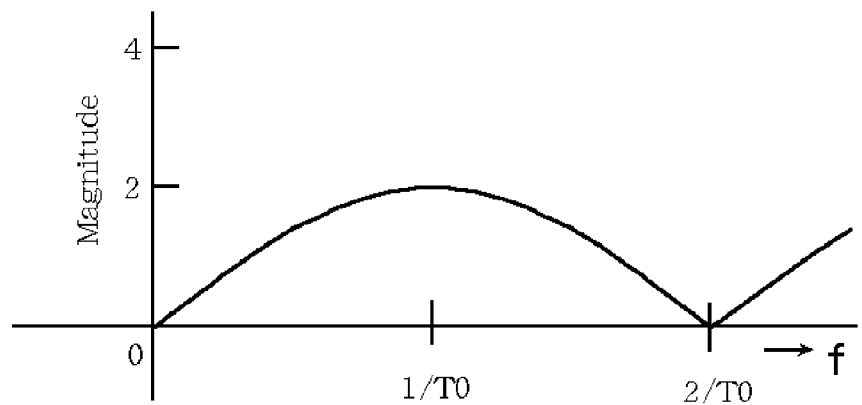
FIG. 5A is a magnitude spectrum of a frequency response of a differential signal between two sampled signals that are acquired by sampling at two points with an interval of dt0.
Figure 5B:
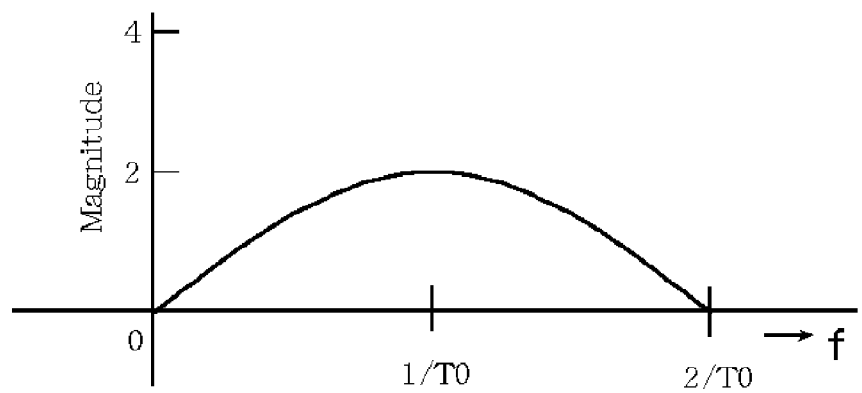
FIG. 5B is a magnitude spectrum of a base-band component of a differential signal between two sampled signals that are acquired by sampling at two points with an interval of dt0.
Figure 5C:
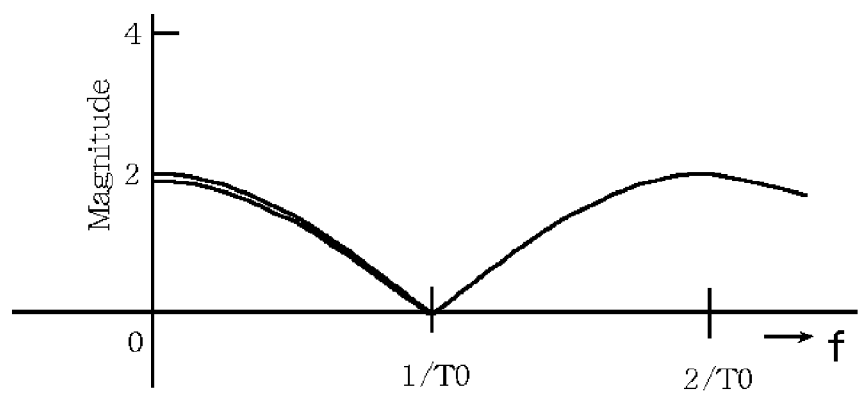
FIG. 5C is a magnitude spectrum of a first harmonics frequency component of a differential signal between two sampled signals that are acquired by sampling at two points with an interval of dt0.
Figure 5D:
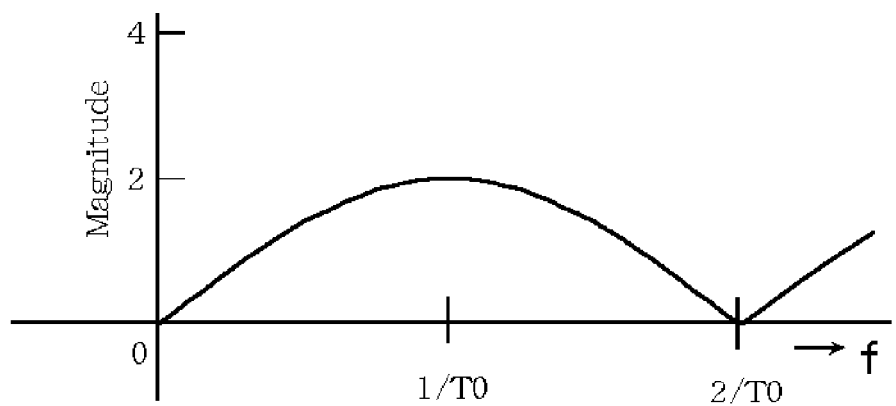
FIG. 5D is a magnitude spectrum of a second harmonics frequency component of a differential signal between two sampled signals that are acquired by sampling at two points with an interval of dt0.
Figure 5E:
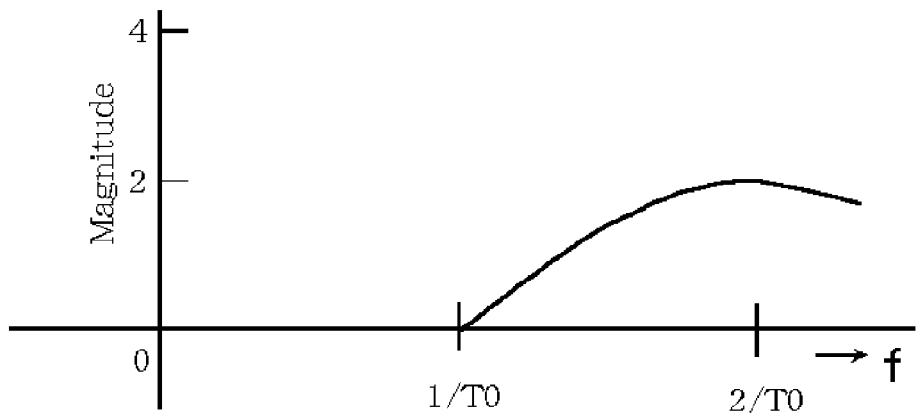
FIG. 5E is a magnitude spectrum of a third harmonics frequency component of a differential signal between two sampled signals that are acquired by sampling at two points with an interval of dt0.
Figure 5F:
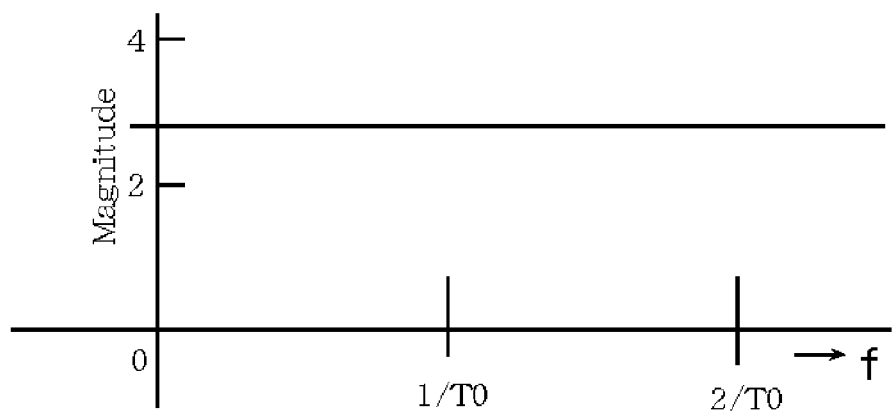
FIG. 5F is a magnitude spectrum of a total frequency component of a differential signal between two sampled signals that are acquired by sampling at two points with an interval of dt0.

Referring now to the drawings, exemplary embodiments of the invention will be described. An example of the imaging apparatus in which the invention is applied is shown in FIG. 1. And, the timing diagram concerning to the signal reproducing method of the invention is shown in FIG. 2.

In the imaging apparatus shown in FIG. 1, reference numeral 1 represents a CCD imaging device. The basic operation of the CCD imaging device 1 in FIG. 1 is same as that of the prior art shown in FIG. 6. Namely, the signal charges generated during the fixed exposure period and accumulated to each pixel 101 are read to corresponding vertical CCD 102 at every vertical blanking period simultaneously by operation of transfer gates which are not shown in a figure. And, the signal charges read to each vertical CCD 102 are transferred toward a horizontal CCD 103 by one step at every horizontal blanking period. Moreover, the signal charges transferred to the horizontal CCD 103 are transferred toward a voltage conversion part 104 at a horizontal period. The voltage signal converted in the voltage conversion part 104 is amplified by an amplifier 105 and is outputted as output signal Vout0 from an output terminal 109.

Figure 6:
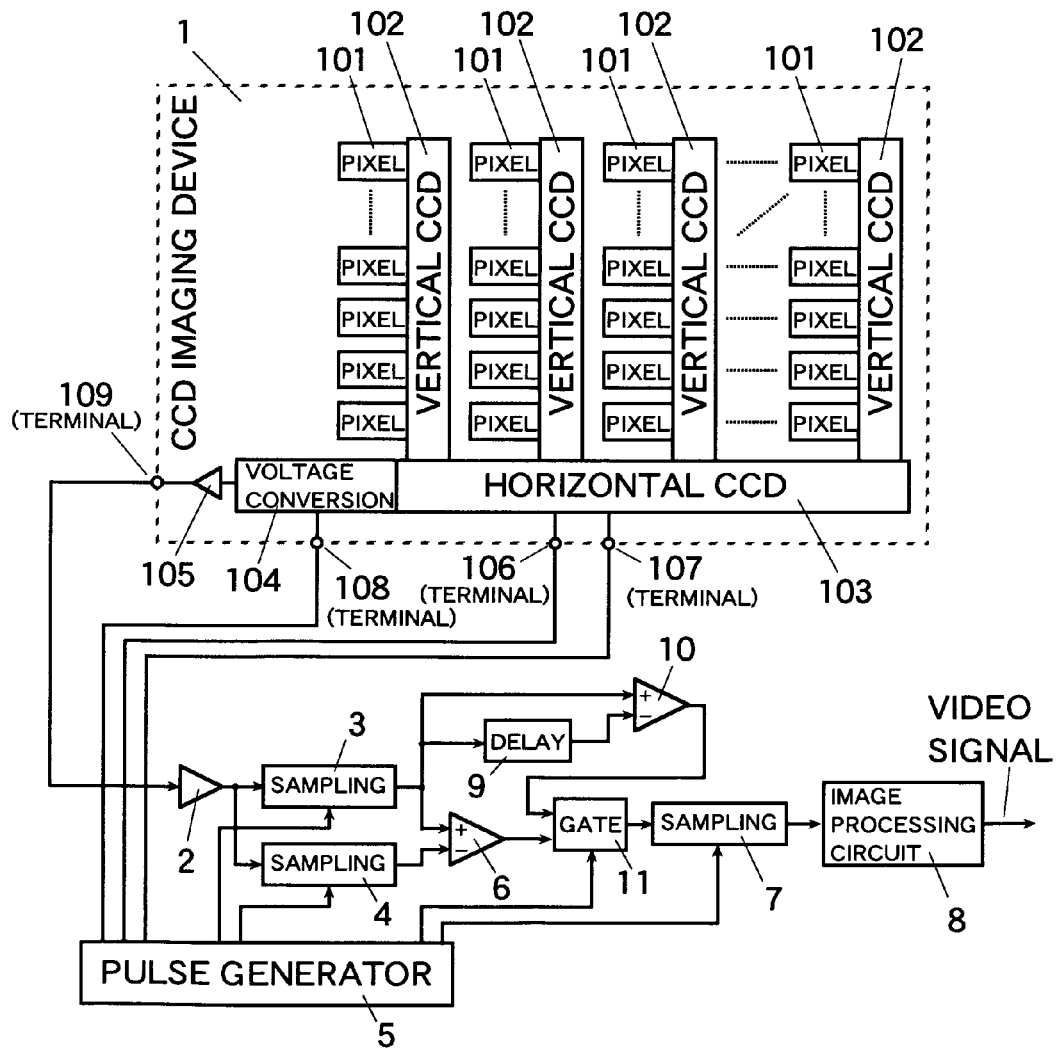
FIG. 6 is a block diagram illustrative of a embodiment of the prior art employing the pixel mixture readout method in combination with a CCD imaging device.
Figure 7:
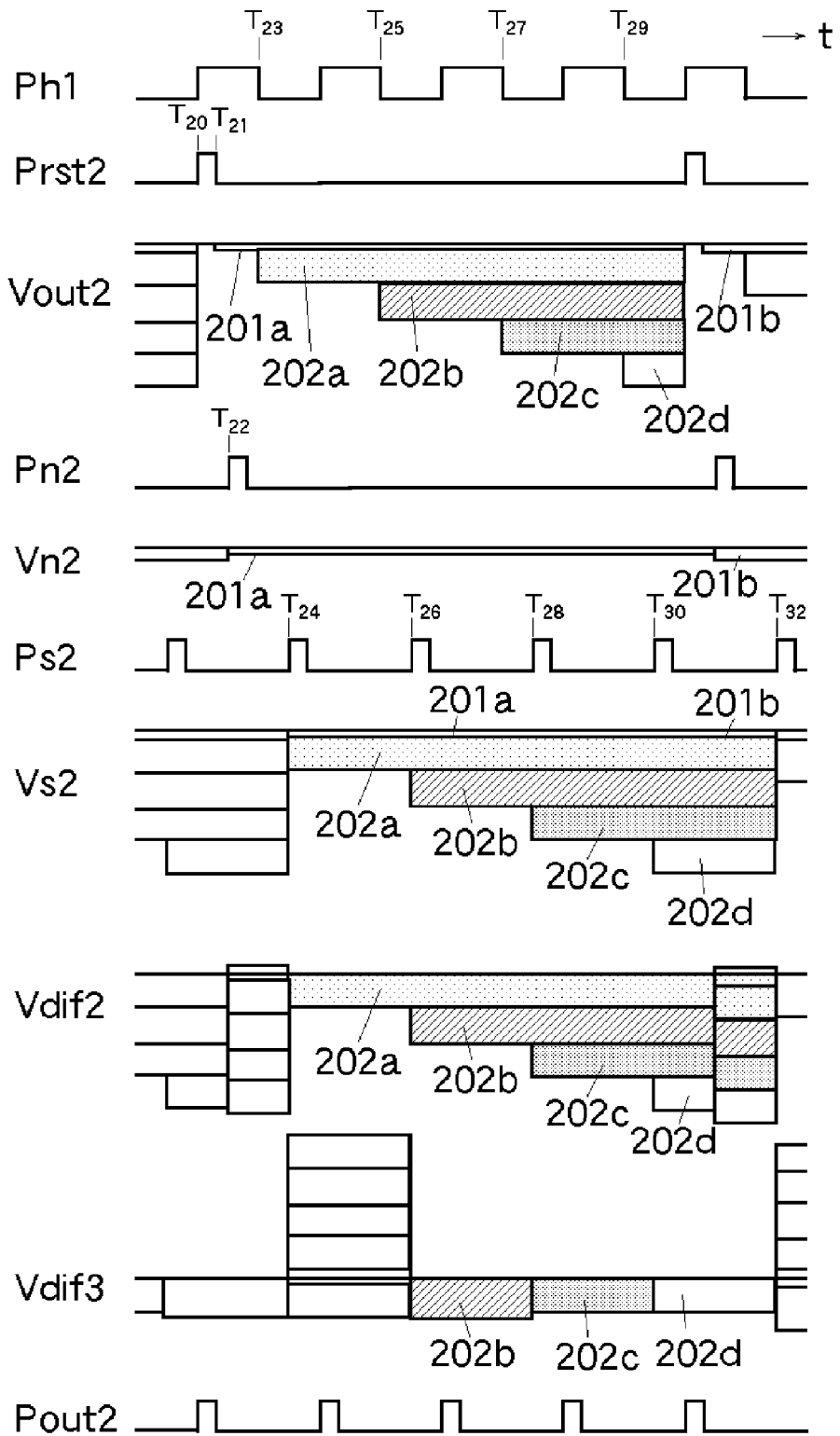
FIG. 7 is a waveform timing diagram useful for understanding the operation of the embodiment of FIG. 6.
Figure 8A:
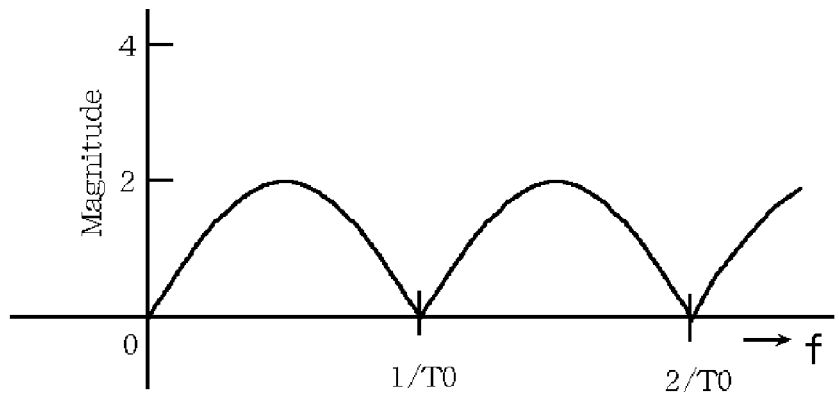
FIG. 8A is a magnitude spectrum of a frequency response of a differential signal between two sampled signals that are acquired by sampling at two points with an interval of T0.
Figure 8B:
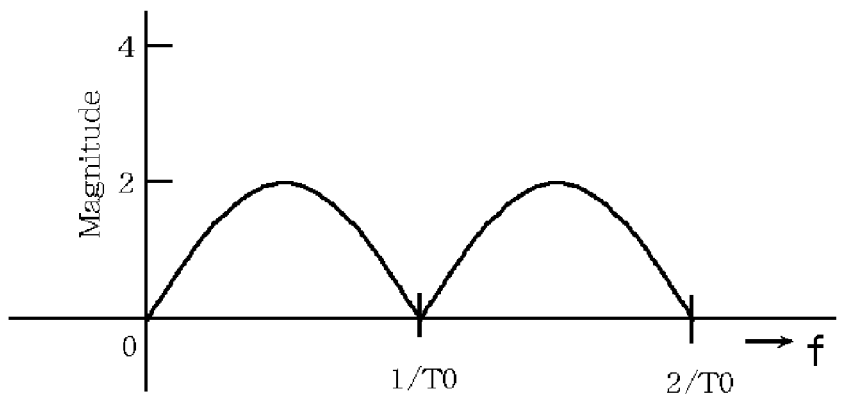
FIG. 8B is a magnitude spectrum of a base-band component of a differential signal between two sampled signals that are acquired by sampling at two points with an interval of T0.
Figure 8C:
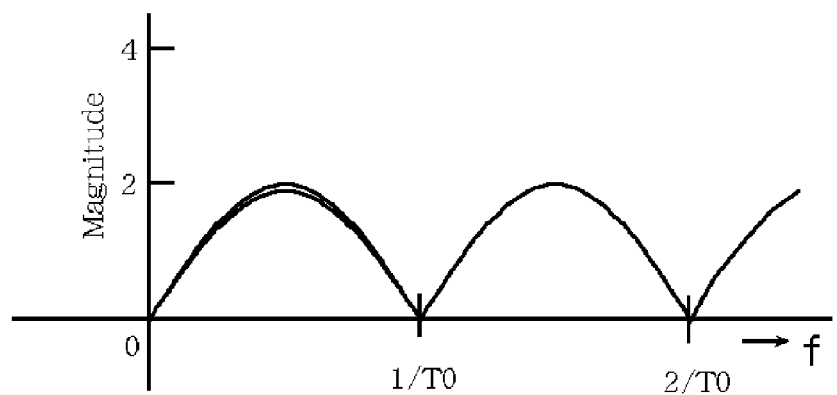
FIG. 8C is a magnitude spectrum of a first harmonics frequency component of a differential signal between two sampled signals that are acquired by sampling at two points with an interval of T0.
Figure 8D:
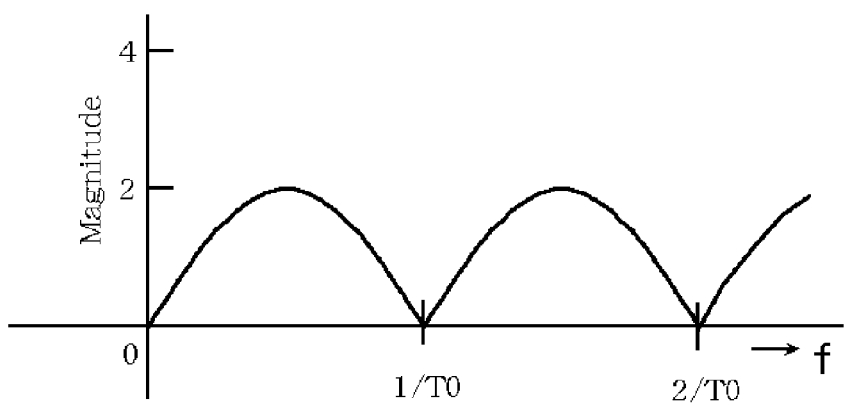
FIG. 8D is a magnitude spectrum of a second harmonics frequency component of a differential signal between two sampled signals that are acquired by sampling at two points with an interval of T0.
Figure 8E:
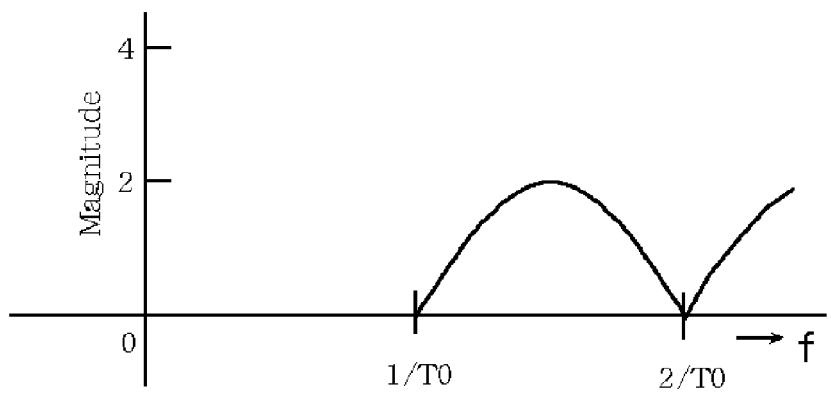
FIG. 8E is a magnitude spectrum of a third harmonics frequency component of a differential signal between two sampled signals that are acquired by sampling at two points with an interval of T0.
Figure 8F:
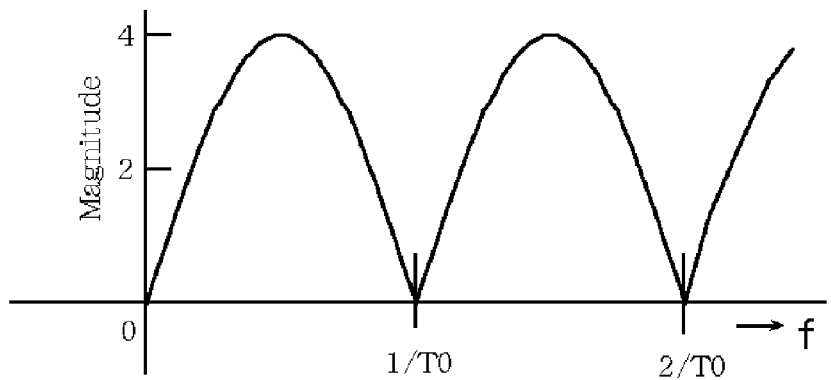
FIG. 8F is a magnitude spectrum of a total frequency component of a differential signal between two sampled signals that are acquired by sampling at two points with an interval of T0.

In the imaging apparatus shown in FIG. 1, the operation of the CCD imaging device 1, the amplifier 2, the sampling circuit 3, the sampling circuit 4, the differential circuit 6, the delay circuit 9, and the differential circuit 10 is same as that of the prior art shown in FIG. 6. On the other hand, the output signal of the differential circuit 6 and the output signal of the differential circuit 10 are applied to a gate circuit 16, wherein the gate circuit 16 is controlled by a control signal generated by a delay circuit 15. Furthermore, the output signal of the CCD imaging device 1 and an output signal generated by a reference voltage generator 14 are applied to a comparator 13. The output signal of the comparator 13 is applied to a pulse controller 12 as a control signal, and is applied to the delay circuit 15 as an input signal. The reset pulse generated by the pulse generator 5 is applied to the pulse controller 12 as an input signal and is outputted from the pulse controller 12 to the terminal 108 of the CCD imaging device 1 selectively. The output signal of the gate circuit 16 is applied to a sampling circuit 7 which is driven by a sampling pulse Pout0 generated by the pulse generator 5. Finally, the output signal acquired from the sampling circuit 7 is applied to the image processing circuit 8 that converts the input signal to the video signal.

As mentioned above, the reset pulse Prst0 generated by the pulse generator 5 is applied to the pulse controller 12, wherein the pulse controller 12 is controlled by a control signal generated by the comparator 13. Thereafter, the output signal from the pulse controller 12 is applied to the terminal 108 of the CCD imaging device 1 as a reset pulse Pcrs0. Thus, the signal charge in the voltage conversion part 104 is swept out by the reset pulse Pcrs0 applied from the pulse controller 12.

Additionally, the output signal Vout0 acquired from the output terminal 109 and a reference voltage Vx0 generated by a reference voltage generator 14 are applied to the comparator 13, where the comparator 13 outputs the control signal Vcon0 according to a result of comparing the output signal Vout0 with the reference voltage Vx0. As the result, the pulse controller 12 is controlled to act as follows. For instance, the pulse controller 12 outputs the reset pulse applied from the pulse generator 5 by the control signal Vcon0 when the output signal Vout0 is greater than the reference voltage Vx0, and prevents the reset pulse applied from the pulse generator 5 by the control signal Vcon0 when the output signal Vout0 is smaller than the reference voltage Vx0.

For instance, the reference voltage Vx0 generated by a reference voltage generator 14 is defined to a half of the maximum voltage value which can be converted without saturation by the voltage conversion part 104. Normally, the maximum voltage value which can be converted without saturation by the voltage conversion part 104 is at least greater than the voltage value which is generated by the maximum signal charge by one pixel.

Thus, when the output signal Vout0 is smaller than the reference voltage Vx0, a signal charge which is transferred to the voltage conversion part 104 by at least the preceding transfer is smaller than a half of the maximum signal charge by one pixel. In this case, considering that a picture has some correlation with the circumference and the rapid change of brightness between adjacent pixels happens rarely, the possibility that the pixel charge acquired from the next pixel is smaller than a half of the maximum signal charge by one pixel is expected to be high. Thus, even if the signal charge in the voltage conversion part 104 is not swept out, the possibility that the voltage conversion part 104 is saturated by adding a signal charge from the next pixel will be low. So, the pulse controller 12 does not output the reset pulse applied from the pulse generator 5. Thus, corresponding pixel signal must be acquired from the difference circuit 10, where the difference circuit 10 generates a difference signal between two sampled signals that are acquired by sampling at two points with an interval of T0.

Alternatively, when the output signal Vout0 is larger than the reference voltage Vx0, a signal charge which has been transferred to the voltage conversion part 104 by then is larger than a half of the maximum signal charge by one pixel. In this case, the pixel charge acquired from the next pixel may be larger than a half of the maximum signal charge by one pixel, so the voltage conversion part 104 may be saturated by adding a signal charge from the next pixel unless being swept out. Thus, the pulse controller 12 outputs the reset pulse applied from the pulse generator 5. Thus, corresponding pixel signal must be acquired from the difference circuit 6, where the difference circuit 6 generates a difference signal between two sampled signals that are acquired by sampling at two points with an interval of dt0.

Referring now to FIG. 2, the timing chart concerning to the output signal Vout0 is explained. For instance, the waveform of Ph1 and the reset pulse Prst0 are illustrated as shown in FIG. 2. When the reset pulse Fcrs0 acquired from the pulse controller 12 is illustrated as shown in FIG. 2, the signal charge in the voltage conversion part 104 is swept out between T00 and T01. Thus, as shown in FIG. 2, a reset noise 201a appears at T01 in the output signal Vout0 acquired from the output terminal 109, and the pixel signal 202a appears, being added to the reset noise 201a, at T03 when Ph1 changes to a low level from a high level. In FIG. 2, the control signal Vcon0 acquired from the comparator 13 is illustrated, assuming that the output signal Vout0 at T03 is smaller in absolute value than the reference voltage Vx0. Thus, the "on" period of the reset pulse Prst0 between T05 and T06 is not applied to the terminal 108 by the pulse controller 12. Then, a pixel signal 202b appears, being added to the reset noise 201a and the pixel signal 202a, at T07 when Ph1 changes to a low level from a high level next time.

Moreover, the control signal Vcon0 acquired from the comparator 13 is illustrated in FIG. 2 as the output signal Vout0 at T07 is still smaller than the reference voltage Vx0. Hence, the "on" period of the reset pulse Prst0 between T08 and T09 is also not applied to the terminal 108 by the pulse controller 12. Consequently, a pixel signal 202c appears to the output signal Vout0, being added to the preceding signal, at T010 when Ph1 changes to a low level from a high level next time. If the output signal Vout0 at T010 is greater than the reference voltage Vx0 as illustrated in FIG. 2, the "on" period of the reset pulse Prst0 between T011 and T012 is applied to the terminal 108 by the pulse controller 12. Therefore, the signal charge in the voltage conversion part 104 is swept out, the output signal Vout0 acquired from the output terminal 109 being reset as illustrated in FIG. 2.

As shown in FIG. 2, the reset noise 201b appears to the output signal Vout0 at 1012 when the reset pulse Prst0 changes to a low level from a high level. Moreover, a pixel signal 202d appears to the output signal Vout0, being added to the reset noise 201b, at 1013 when Ph1 changes to a low level from a high level. When the output signal Vout0 at 1013 is greater than the reference voltage Vx0 as illustrated in FIG. 2, the "on" period of the reset pulse Prst0 between T014 and T015 is applied to the terminal 108 by the pulse controller 12. Similarly, when the output signal Vout0 is greater than the reference voltage Vx0, the signal charge in the voltage conversion part 104 is swept out according to the control signal Vcon0 acquired from the comparator 13. It is apparent from FIG. 2 that the function of the pulse controller 12 can be accomplished by a gate circuit which controls the reset pulse Prst0 according to a control signal that is produced by delaying the control signal Vcon0 acquired from the comparator 13 in the delay time which is equal to the width of the reset pulse Prst0.

The sampling pulse Ps0 and Pn0 generated by the pulse generator 5 are applied to the sampling circuit 3 and 4 respectively, such as in the prior art shown in FIG. 6. Thus, an output signal Vs0 acquired from the sampling circuit 3 and an output signal acquired from the sampling circuit 4 Vn0 are illustrated in FIG. 2. Furthermore, the output signal Vs0 from the sampling circuit 3 and the output signal Vn0 from the sampling circuit 4 are applied to a differential circuit 6, the differential circuit 6 producing a differential signal Vdif01. Thus, as shown in FIG. 2, the pixel signal 202a appears to the differential signal Vdif01 between T016 and T017, the reset noise 201a being removed. Similarly, the pixel signal 202d appears to the differential signal Vdif01 between T022 and T023, the reset noise 201b being removed.

On the other hand, an output signal Vs0d acquired from the delay circuit 9 is illustrated in FIG. 2, wherein the delay circuit 9 delays the output signal Vs0 acquired from the sampling circuit 3 for T0. By applying the output signal Vs0d and the output signal Vs0 to the differential circuit 10, the pixel signal 202b appears to the difference signal Vdif02 acquired from the differential circuit 10 at a period between T018 and T020. And, a pixel signal 202c appears to the difference signal Vdif02 at a period between T020 and T022.

Then, the differential signal Vdif01 from the differential circuit 6 and the differential signal Vdif02 from the differential circuit 10 are applied to the gate circuit 16, wherein the gate circuit 16 is controlled by a control signal Vcon0d acquired from a delay circuit 15 which delays Vcon0 from the comparator 13 for T0. In FIG. 1, it is assumed that the gate circuit 16 outputs the differential signal Vdif01 acquired from the differential circuit 6 when the control signal Vcon0d is high level, and outputs the differential signal Vfif02 acquired from the differential circuit 10 when the control signal Vcon0d is low level. As a result, an output signal Vcds0 is acquired from the gate circuit 7 which samples an output signal from the gate circuit 16 by a sampling pulse Pout0 shown in FIG. 2. As illustrated in FIG. 2, the output signal Vcds0 consists of only pixel signals without reset noise. Therefore, the output signal Vcds0 is acquired from a differential signal between two sampled signals that are acquired by sampling at two points with an interval of T0 when the signal charge in the voltage conversion part 104 is not swept out by the reset pulse, so, the amplifier noise around frequency zero can be reduced effectively.

When each signal charge generated by a pixel is small enough, the output signal Vout0 from the output terminal 109 of the CCD imaging device 1 does not exceed the reference voltage Vx0 until signal charges from large number of pixels are mixed in the voltage conversion part 104. Thus, the interval of the reset pulse Pcrs0 becomes long. Consequently, the ratio of the differential signal Vdif02 in which the amplifier noise around frequency zero is reduced by acquiring from a differential signal between two sampled signals that are acquired by sampling at two points with an interval of T0 becomes large in the output signal Vcds0. Furthermore, since the signal charge in the voltage conversion part 104 is swept out by the reset pulse Pcrs0 when the output signal Vout0 exceeds the reference voltage V0x, the voltage conversion part 104 may not be saturated even if a signal charge generated by a pixel is large.

Although the sampling circuit 3, the sampling circuit 4, the delay circuit 9, differential circuit 6, the differential circuit 10, the gate circuit 16, and sampling circuit 7 are assumed as discrete components in above explanation, it is apparent to one skilled in the art that they can be realized by other constructions which achieve their functions. For instance, a circuit that acts as not only the gate circuit 16 but the sampling circuit 7 will be realized easily. Additionally, when the output signal from the output terminal 109 of the CCD imaging device is converted into a digital signal, functions of circuits following the amplifier 2 can be realized by processing in software.

Also, the reference voltage Vx0 is defined to be a half of the maximum voltage value which can be converted without saturation by the voltage conversion part 104 in above explanation. However, it is apparent that the possibility that the voltage conversion part 104 is not saturated with the signal charge of next pixel becomes larger if the reference voltage Vx0 is defined smaller, though the interval of the reset pulse will be shorter. For instance, when the reference voltage Vx0 is defined to be one fourth of the maximum voltage value which can be converted without saturation by the voltage conversion part 104, the voltage conversion part 104 will not be saturated with next signal charge which corresponds to up to three fourth of the maximum voltage value which can be converted without saturation by the voltage conversion part 104.

I claim:

1. A method for reproducing each pixel signal of a solid state imaging device having a plurality of pixels, said solid state imaging device comprising at least one charge transfer means and a voltage conversion means wherein said at least one charge transfer means periodically transfers a pixel charge generated by a pixel in said plurality of pixels to said voltage conversion means at a predetermined interval and wherein said voltage conversion means converts said pixel charge into a voltage signal value, said method comprising steps of:
   detecting a first output signal acquired from said voltage conversion means;
   setting a first value to a control signal when said first output signal is larger than a predetermined reference signal value;
   sweeping out a signal charge in said voltage conversion means when said control signal is said first value;
   detecting a second output signal acquired from said voltage conversion means;
   transferring a first pixel charge generated by a first pixel in said plurality of pixels to said voltage conversion means by said at least one charge transfer means;
   detecting a third output signal acquired from said voltage conversion means;
   providing a first differential signal by subtracting said first output signal from said third output signal;
   providing a second differential signal by subtracting said second output signal from said third output signal; and
   providing a pixel signal that corresponds to said first pixel wherein said pixel signal is said first differential signal when said control signal is not said first value and wherein said pixel signal is said second differential signal when said control signal is said first value.

2. A method according to claim 1 wherein said predetermined reference signal value is smaller than a half of the maximum voltage value which can be converted without saturation by said voltage conversion means.

* * * * *